US011528892B2

(12) United States Patent
Clark et al.

(10) Patent No.: US 11,528,892 B2
(45) Date of Patent: Dec. 20, 2022

(54) ORIOLE BIRD FEEDER

(71) Applicants: Scott A. Clark, Ypsilanti, MI (US);
Jean Clark, Otisville, MI (US)

(72) Inventors: Scott A. Clark, Ypsilanti, MI (US);
James Ward Clark, Otisville, MI (US)

(*) Notice: Subject to any disclaimer, the term of this patent is extended or adjusted under 35 U.S.C. 154(b) by 0 days.

(21) Appl. No.: 17/036,249

(22) Filed: Sep. 29, 2020

(65) Prior Publication Data
US 2022/0095590 A1 Mar. 31, 2022

(51) Int. Cl.
*A01K 39/00* (2006.01)
*A01K 39/014* (2006.01)
*A01K 31/12* (2006.01)

(52) U.S. Cl.
CPC .......... *A01K 39/014* (2013.01); *A01K 31/12* (2013.01); *A01K 39/00* (2013.01)

(58) Field of Classification Search
CPC ...... A01K 39/014; A01K 31/12; A01K 39/00; A01K 39/01
See application file for complete search history.

(56) References Cited

U.S. PATENT DOCUMENTS

| 3,049,093 | A | * | 8/1962 | Oliver | A01K 39/014 119/475 |
| 3,083,687 | A | * | 4/1963 | Slaven | A01K 39/0113 119/52.2 |
| 3,191,579 | A | * | 6/1965 | Oliver | A01K 39/014 D30/124 |
| D396,334 | S | * | 7/1998 | Gutierrez | D30/124 |
| 5,881,675 | A | * | 3/1999 | Shaffer | A01K 39/012 119/435 |
| 7,093,563 | B1 | * | 8/2006 | Reynolds | A01K 39/0113 119/428 |
| 7,219,621 | B2 | * | 5/2007 | Coroneos | A01K 39/0113 119/51.01 |
| 7,516,715 | B2 | * | 4/2009 | Conlon | A01K 39/012 119/52.2 |
| 9,655,345 | B1 | * | 5/2017 | Hill | A01K 39/0206 |
| 10,130,079 | B2 | * | 11/2018 | Cote | A01K 31/12 |
| 2004/0134437 | A1 | * | 7/2004 | Fort, II | A01K 39/012 119/57.8 |
| 2006/0272585 | A1 | * | 12/2006 | O'Dell | A01K 39/012 119/57.8 |
| 2008/0141944 | A1 | * | 6/2008 | Liethen | A01K 39/014 119/51.03 |
| 2012/0216750 | A1 | * | 8/2012 | Cruz | A01K 39/0206 119/72 |
| 2014/0150725 | A1 | * | 6/2014 | Moone | A01K 39/012 119/51.01 |
| 2015/0136031 | A1 | * | 5/2015 | Evans | A01K 39/012 119/51.01 |
| 2015/0136032 | A1 | * | 5/2015 | Cote | A01K 39/012 119/57.8 |

* cited by examiner

*Primary Examiner* — Monica L Perry
(74) *Attorney, Agent, or Firm* — Honigman LLP

(57) ABSTRACT

A bird feeder includes a container and a lid. The container includes a body and a neck. The neck includes an opening and the outer surface of the neck includes a first thread. The lid is configured to engage the neck. The lid includes a top wall and a side wall bounding a peripheral edge of the top wall. An inner surface of the side wall includes a second thread that is configured to engage the first thread of the neck so as to close the lid onto the container. The top wall includes an opening and a perch is disposed on the lid. An attachment member is formed on an outer surface of the lid.

11 Claims, 7 Drawing Sheets

ORIOLE BIRD FEEDER

TECHNICAL FIELD

This disclosure relates to a bird feeder.

BACKGROUND

Bird feeders may be hung from a structure such as a tree or a man-made stand. Such bird feeders are manufactured by assembling multiple parts together, which increases cost and complexity. Further, the bird feeders are configured to provide a top down feed system, wherein the feed is supplied to a bottom opening using gravity. However, the feed may become compacted within the body of the container thus preventing the feed from reaching the opening.

Accordingly, it remains desirable to have bird feeder which may be assembled so as to reduce manufacturing complexity and costs and ensure that the feed remains accessible.

SUMMARY

A bird feeder is disclosed. The bird feeder is configured to hang from a structure. The bird feeder includes a container and a lid. The container includes a body and a neck. The neck includes an opening.

The lid is configured to engage the neck. In one aspect, the outer surface of the neck may include a first thread. The lid includes a top wall and a side wall bounding a peripheral edge of the top wall. An inner surface of the side wall may include a second thread that is configured to engage the first thread of the neck so as to close the lid onto the container.

The top wall includes an opening and a perch is disposed on the lid. An attachment member is formed on an outer surface of the lid. Accordingly, the bird feeder may be attached to a structure, such as a tree branch by tying one end of a string to the branch and the other end of the string to the attachment member, wherein a bird may engage the perch and access the bird feed through the opening of the top wall.

In one aspect, the attachment member is disposed on an outer surface of the side wall of the lid, and the attachment member is a loop. The bird feeder may further include the string for securing the attachment member to the structure.

In another aspect of the bird feeder, wherein the perch is a rod extending between opposing sides of the lid, and the opening of the lid defines a semicircle.

In yet another aspect of the bird feeder, the container has a body that is generally cuboidal. The body may occupy a space of one of either a pint or a half pint.

In yet another aspect of the bird feeder, the lid may be formed of a material suitable for a stamping process. Alternatively, the lid may be formed of a material suitable for an injection molding process. The hood disposed on the lid. The hood may be spaced apart from and opposite of the perch.

Accordingly, a bird feeder is provided which is simple in construction. The attachment member suspends the body of the container at an angle. When a bird rests upon the perch, a cantilevered force is generated opposing the angled body so as to allow the bird easy access to the bird feed through the opening of the lid.

DETAILED DESCRIPTION

Figure 1:
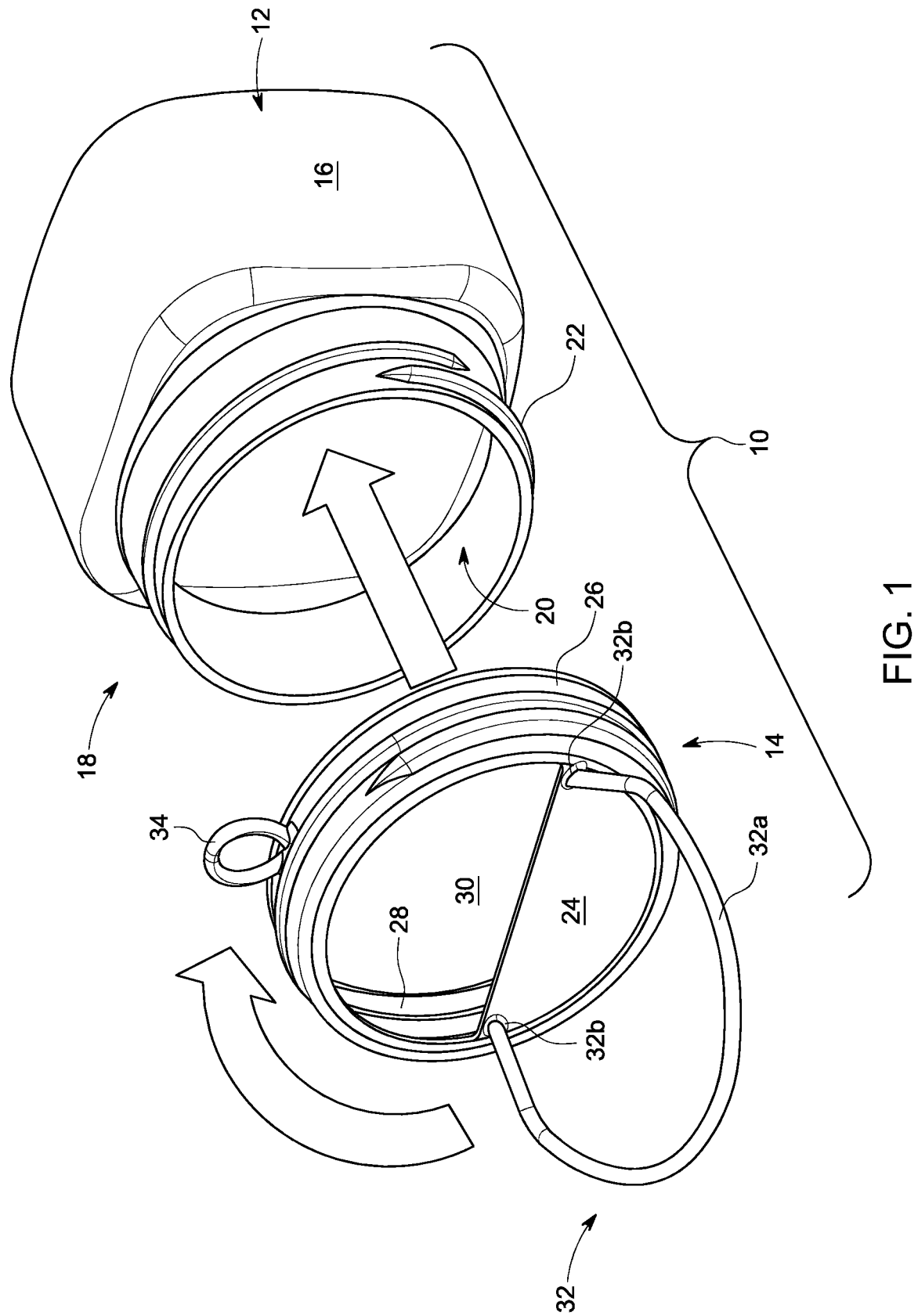
FIG. 1 is a view of a first embodiment of bird feeder according to the principles of the present disclosure.

A bird feeder includes a container and a lid. In one aspect, the bird feeder is configured to attract an Oriole. The container includes a body and a neck and is configured to hold bird feed. The lid is configured to engage the neck. The top wall includes an opening and a perch is disposed on the lid. An attachment member is disposed on an outer surface of the lid. The bird feeder is configured to be attached to a structure, such as a tree branch by tying one end of a string to the branch and the other end of the string to the attachment member, wherein a bird may engage the perch and access the bird feed through the opening of the top wall.

With reference now to FIGS. 1-3a first preferred embodiment of a bird feeder 10 is provided. The bird feeder 10 is configured to hang from a structure (not shown). The structure may be a natural structure such as a tree branch or may be a man-made structure such as a shepards hook or a clothes line pole.

The bird feeder 10 includes a container 12 and a lid 14 configured to engage the container 12. The container 12 includes a body 16 and a neck 18 with first opening 20. The container 12 may be made of any material suitable for storing bird feed, such as glass, metal, thermoplastic or a polypropylene. For illustrative purposes, the body 16 of the container 12 is generally cuboidal so as to be dimensioned as a pint-sized jelly jar; however, it should be appreciated that the body 16 of the container 12 may be dimensioned otherwise or may be smaller, such as a half-pint sized jelly jar. Any bird feed currently known or used may be adapted for use in the bird feeder 10, illustratively including jelly, grains, seeds or the like.

The lid 14 includes a top wall 24 and a side wall 26 bounding a peripheral edge of the top wall 24. An inner surface of the side wall 26 is configured to the neck 18 so as to close the lid 14 onto the container 12. The lid 14 may be formed a material suitable for an injection molding process such as a thermoplastic or polypropylene. Alternatively, the lid 14 is formed of a material suitable for a stamping process such as a metal, to include steel or aluminum.

In a preferred aspect, the inner surface of the side wall 26 has a second thread 28 and the outer surface of the neck 18 as a first thread 22, the second thread 28 configured to engage the first thread 22 so as to screw the lid 14 onto the neck 18. However, it should be appreciated that other mechanical securing means may be used to mount the lid 14 onto the neck 18, illustratively including a snap-fit engagement or a tab and locking feature.

The top wall 24 includes a second opening 30 which provides access to the contents of the body 16 of the container 12. For illustrative purposes, the second opening 30 is shown as being a semicircle. However; it should be appreciated that the second opening 30 may be shaped otherwise. For instance, the second opening 30 may be circular, crescent or the like. The top wall 24 provides a barrier to help retain the bird feed within the body 16.

The bird feeder 10 includes an attachment member 34. The attachment member 34 is configured to suspend the container 12 at an angle as illustratively shown in FIG. 7. The attachment member 34 provides a surface for which a string 36 may be attached so as to evenly distribute the weight of the body 16. The attachment member 34 is formed on an outer surface of the lid 14 along the peripheral edge of the top wall 24.

In one aspect, the attachment member 34 is disposed on the outer surface of the side wall 26 of the lid 14. Preferably, the attachment member 34 is a loop. The loop is shown as being generally circular, but may be oblong or triangular as well. It should also be appreciated that the attachment member 34 need not be closed, and may include an opening so as to form the shape of a hook. The bird feeder 10 may include a string 36 for securing the attachment member 34 to the structure.

The bird feeder 10 further includes a perch 32. The perch 32 is configured to provide a platform for which a bird may perch upon. The perch 32 is disposed on the lid 14. The perch 32 protrudes from a top surface of the top wall 24 of the lid 14. In one aspect, the perch 32 is a rod 32a extending between opposing sides of the lid 14. The rod 32a is bent so as to curve outwardly from the top surface of the top wall 24 of the lid 14. In another aspect, the perch 32 includes a platform 38 projecting from the top surface of the top wall 24 of the lid 14. The platform 38 may be solid or may be webbed.

Figure 2:
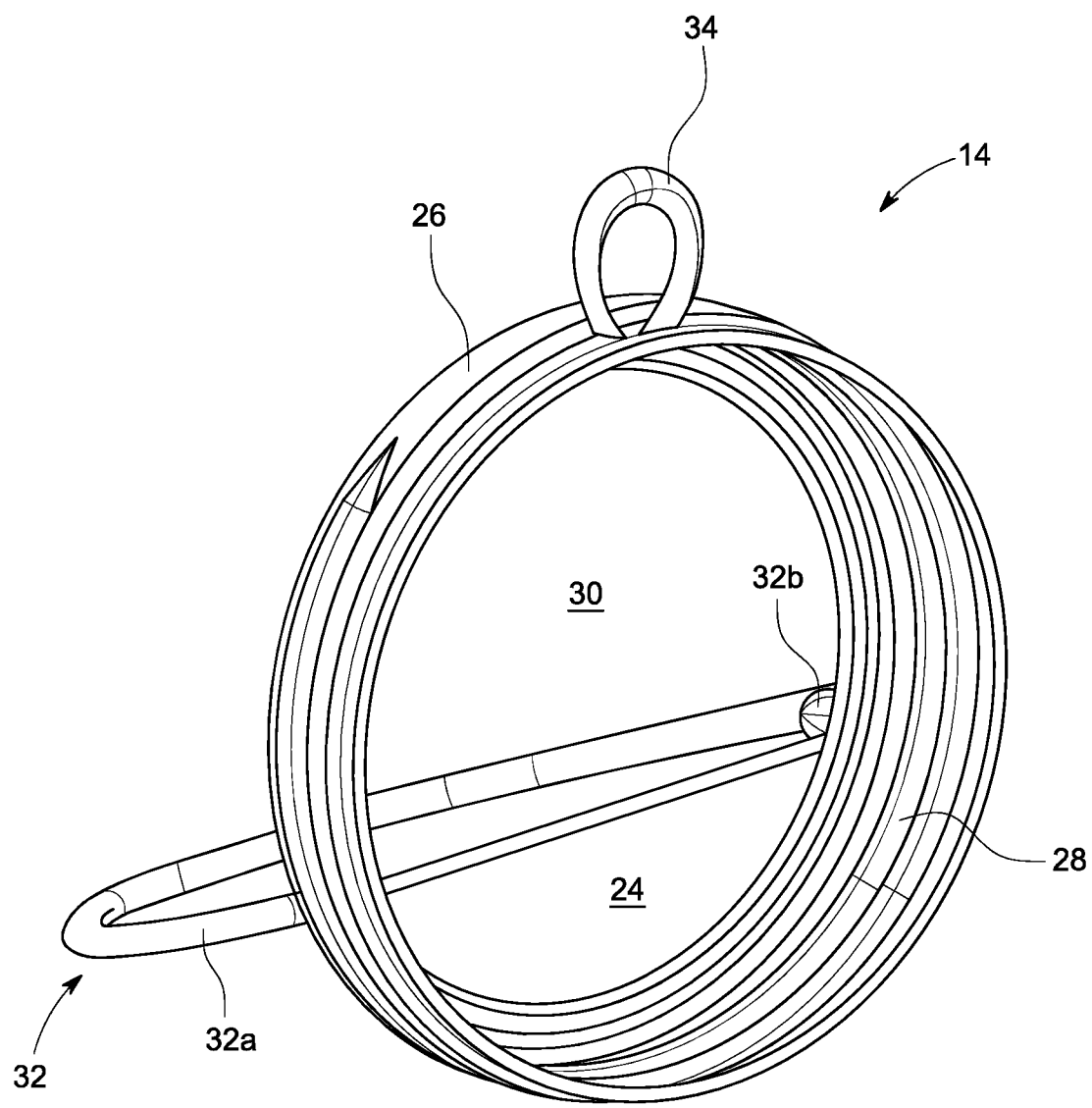
FIG. 2 is an isolated view of a lid taken from the back.
Figure 3:
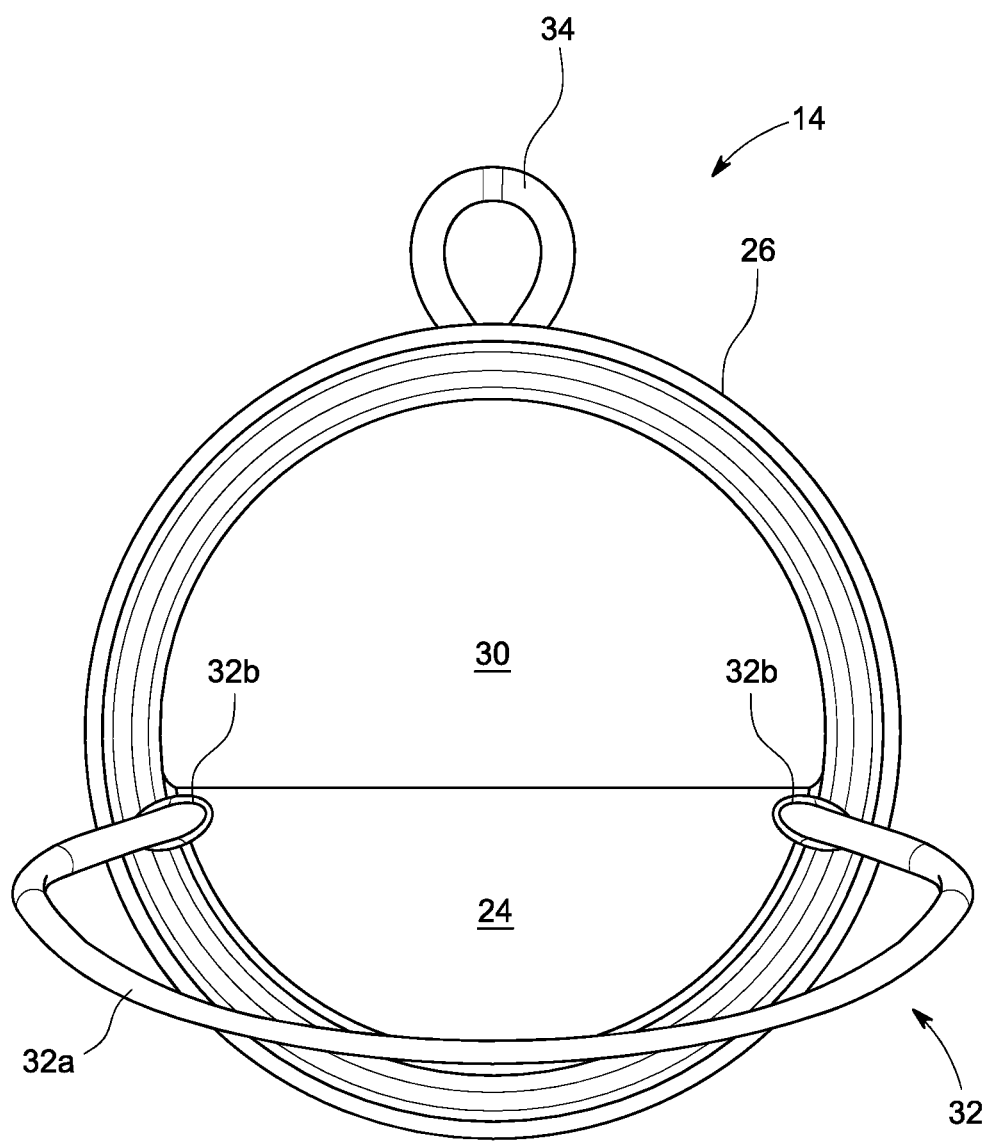
FIG. 3 is a view of the lid shown in FIG. 2 taken from the front

With reference again to FIGS. 2 and 3, an aspect of the lid 14 formed of a material suitable for a stamping process, such as steel, aluminum or tin is provided. The perch 32 is angled acutely with respect to the top surface of the top wall 24. The ends 32b of the perch 32 are welded to the top surface of the top wall 24. FIGS. 2 and 3 show an aspect of an attachment member 34 that is a looped member wherein the opening of the loop is disposed along a plane which is generally parallel to the second opening 30 of the lid 14.

Figure 4:
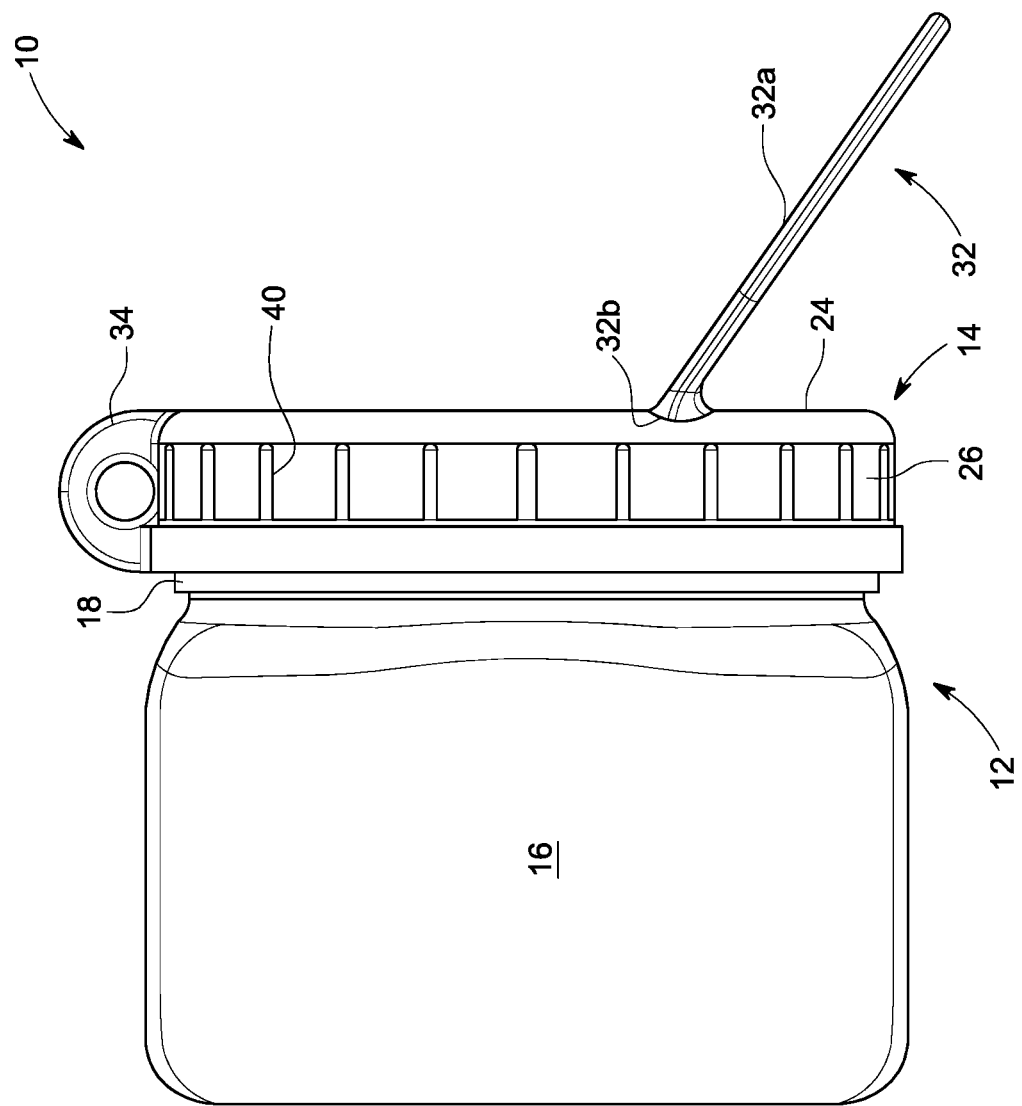
FIG. 4 is a view of a bird feeder having a lid made of a thermoplastic.
Figure 5:
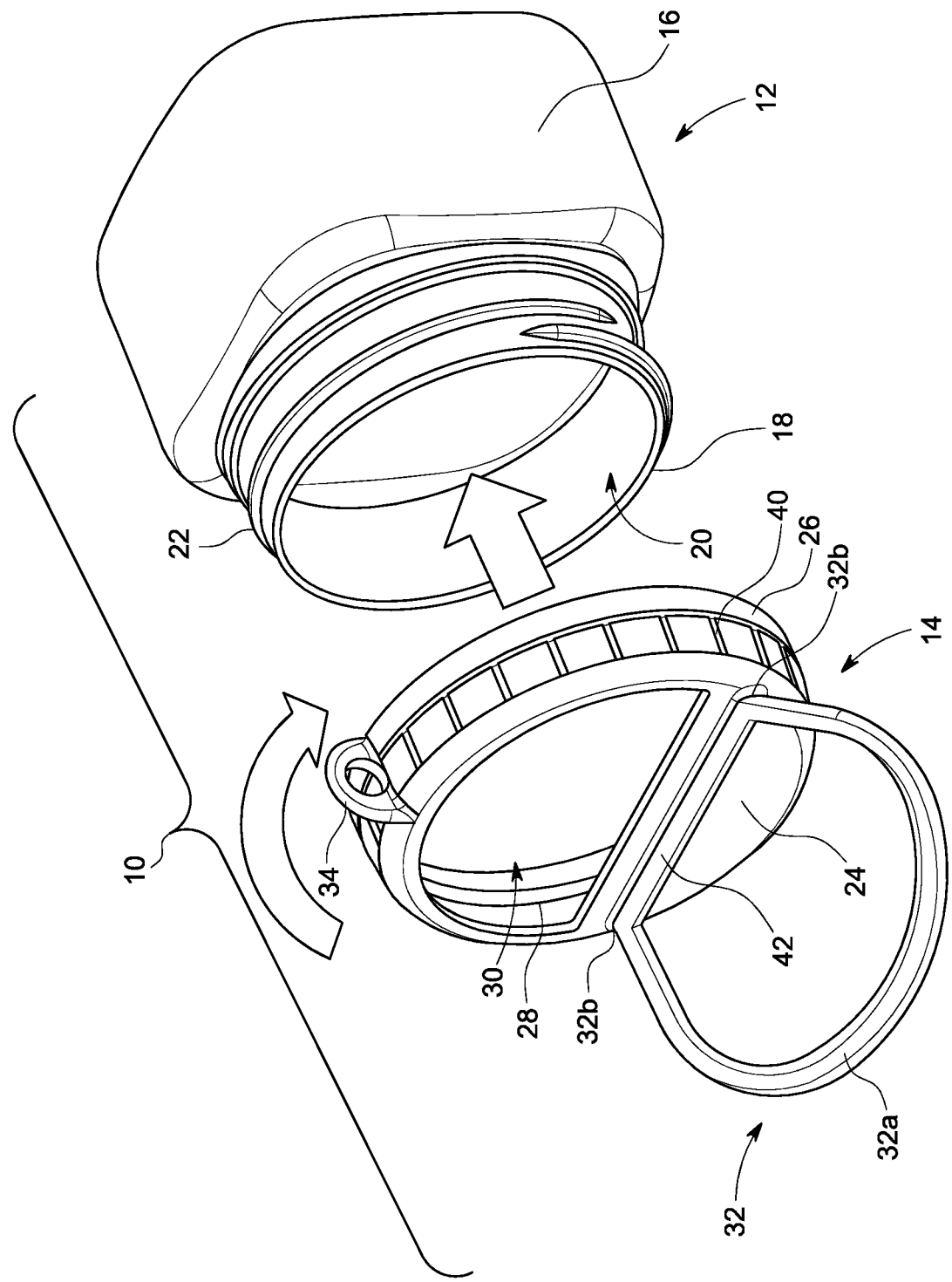
FIG. 5 is an exploded view of the bird feeder incorporating the lid shown in FIG. 4.

With reference now to FIGS. 4 and 5, the bird feeder 10 is shown as having a lid 14 formed of a thermoplastic. In such an aspect, the lid 14 is made using an injection molding process. The outer surface of the side wall 26 of the lid 14 may include a plurality of ribs 40 spaced apart from each other. Each of the ribs 40 extend along an axis which defines the height of the side wall 26. The ribs 40 are generally similar in dimension and are generally equally spaced apart from each other. The ribs 40 assist with gripping the lid 14 to help the user secure the lid 14 onto the container 12. FIGS. 4 and 5 show an aspect of an attachment member 34 that is a looped member wherein the opening of the loop is disposed along a plane which is orthogonal to the plane of the second opening 30 of the top wall 24 of the lid 14.

The perch 32 is integrally formed to the top wall 24 of the lid 14. The perch 32 is disposed below a top edge of the top wall 24, and is angled acutely with respect to the top surface of the top wall 24. The perch 32 has a generally uniform width and the ends 32b of the perch 32 are reinforced by an elongated bead 42 extending between the ends 32b of the perch 32.

Figure 6:
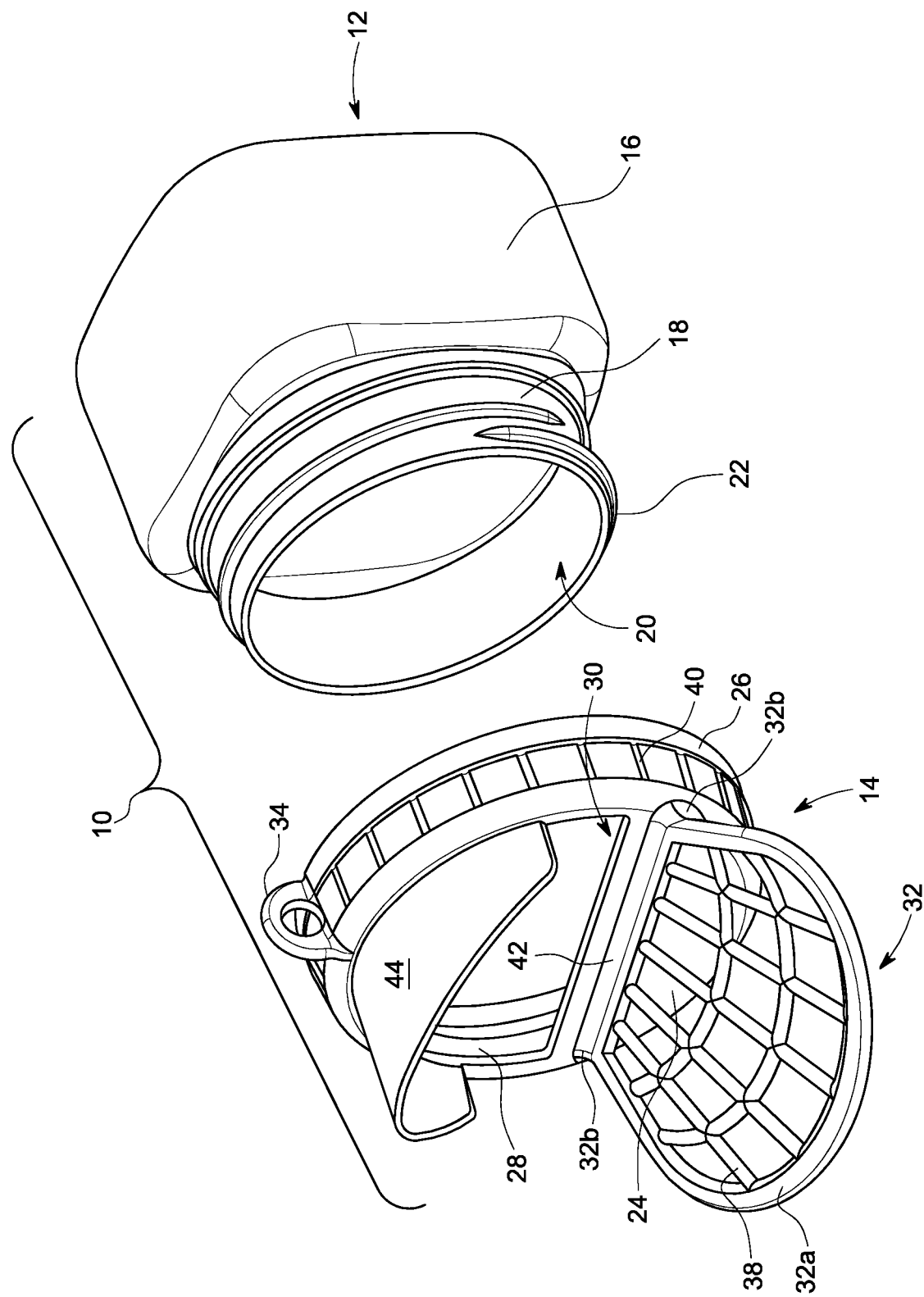
FIG. 6 is an exploded view of a bird feeder wherein the lid includes a hood.

With reference now to FIG. 6, a second embodiment of the bird feeder 10 is provided. FIG. 6 shows that container 12 is dimensioned the same as the containers 12 shown in FIGS. 1-5. The lid 14 is substantially the same as the lids 14 shown in FIGS. 1-5. The lid 14 further includes a hood 44 disposed on the outer surface of the top wall 24. The hood 44 is spaced apart from and opposite to the perch 32. The hood 44 is a solid member having a bend at the middle. The hood 44 may provide a decorative function as well as shade for the bird or a shield to prevent rain entering the jar. For instance, the hood 44 may be shaped semi-circular.

FIG. 6 depicts another aspect of the perch 32. The perch 32 is integrally formed to the top wall 24 of the lid 14. The perch 32 is disposed below a top edge of the top wall 24, and is angled acutely with respect to the top surface of the top wall 24. The rod 32a has a generally uniform width and the ends 32b are reinforced by an elongated bead 42 extending between the ends 32b of the perch 32. The perch 32 further includes a platform 38 projecting from the top surface of the top wall 24 of the lid 14 and is bound by the rod 32a. FIG. 6 shows an aspect where the platform 38 is webbed, but is should be appreciated that the platform may be solid.

With reference now to FIGS. 2, 5-7 a description of the operation of the bird feeder 10 is provided herein. The user simply fills the container 12 with a desired bird feed. The lid 14 is then mounted onto the container 12. The figures show a means for mounting the lid 14 onto the container 12 by simply screwing the lid 14 onto the neck 18. One end of a string 36 is tied onto the attachment member 34 and the other end is tied onto a structure (not shown) so as to suspend the container 12.

Figure 7:
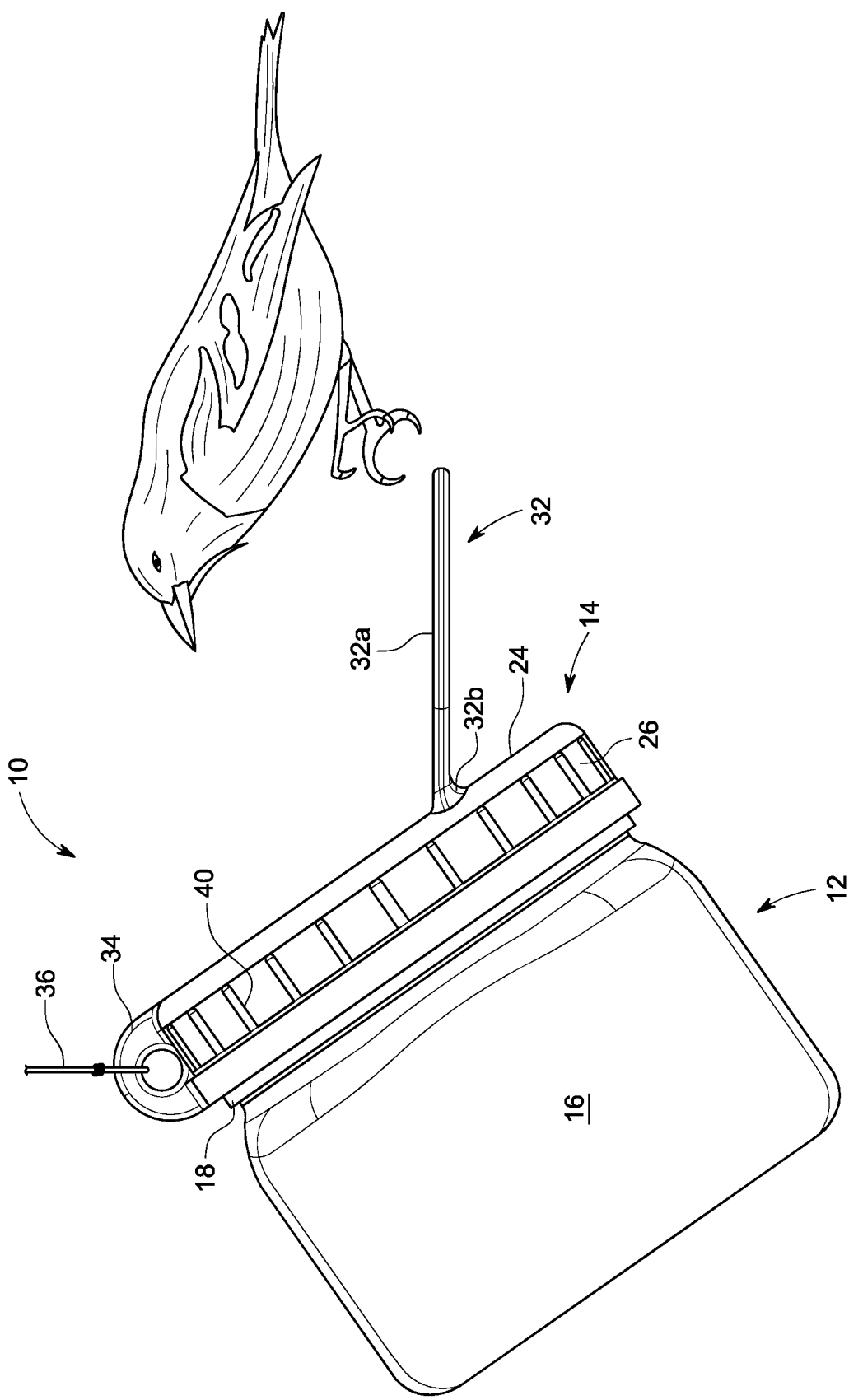
FIG. 7 is a view showing a bird about to perch on the perch.

As the attachment member 34 is located adjacent the peripheral edge of the top wall 24, on the side wall 26 in this case, the body 16 of the container 12 is tilted when suspended (as depicted in FIG. 7). When a bird perches onto the perch 32, the weight of the bird generates a cantilevered force which opposes the tilt of the container 12 and the bird is able to simply access the bird feed through the second opening 30.

For illustrative purposes, an operation of the bird feeder 10 is provided. In one aspect, the bird feeder 10 is configured to feed an oriole. In such an aspect, the body 16 of the bird feeder 10 may be painted orange. The body 16 of the bird feeder 10 is filled with a grape jelly.

The lid 14 is attached to the body 16 of the bird feeder 10. In a preferred aspect, the lid 14 is formed of a stamped material, such as a tin or aluminum. The lid 14 includes a hood 44 to shield the Oriole from rain. The lid 14 is secured to a shepherds hook so as to suspend the bird feeder 10. In particular, one end of a string is attached to the attachment member 34 and the other end of the string is attached to the shepherds hook.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bird feeder configured to hang from a structure, the bird feeder comprising:

a container having a body configured to hold bird feed and a neck with a first opening;

a lid having a top wall and a side wall bounding a peripheral edge of the top wall, an inner surface of the side wall configured to engage an outer surface of the neck so as to close the lid onto the container, the top wall being a planar surface, the lid having a second opening, the second opening being coplanar with the top wall;

a perch disposed on the lid and projecting outwardly from the top wall;

an attachment member is formed on an outer surface of the lid, the attachment member is disposed on the side wall of the lid and along a peripheral edge defining the second opening so as to be opposite of the top wall; and a string for securing the attachment member to the structure, the bird feeder configured to tilt about the attachment member when a bird perches on the perch, the bird generating a cantilevered force that opposes the tilt so as to shift the bird feed towards the top wall, the top wall defining a barrier to retain bird feed within the body, and the second opening facilitating access to the bird feed.

2. The bird feeder as set forth in claim 1, wherein the attachment member is a loop.

3. The bird feeder as set forth in claim 2, wherein the perch is a rod extending between opposing sides of the lid.

4. The bird feeder as set forth in claim 1, wherein the second opening defines a semicircle.

5. The bird feeder as set forth in claim 1, wherein the body is cuboidal.

6. The bird feeder as set forth in claim 1, wherein the body occupies a space of one of either a pint or a half pint.

7. The bird feeder as set forth claim 1, wherein the lid is formed of a material suitable for a stamping process.

8. The bird feeder as set forth in claim 1, wherein the lid is formed of a material suitable for an injection molding process.

9. The bird feeder as set forth in claim 1, further including a hood disposed on the lid.

10. The bird feeder as set forth in claim 9, wherein the hood is spaced apart from and opposite of the perch.

11. The bird feeder as set forth in claim 1, wherein the neck includes a first thread disposed on the outer surface of the neck and the inner surface of the side wall includes a second thread configured to engage the first thread of the neck.

* * * * *